(12) United States Patent
Howell

(10) Patent No.: US 11,494,743 B2
(45) Date of Patent: Nov. 8, 2022

(54) EVENT NOTIFICATION AND TIME AWARENESS SYSTEM

(71) Applicant: Mike Howell, Mesa, AZ (US)

(72) Inventor: Mike Howell, Mesa, AZ (US)

(*) Notice: Subject to any disclaimer, the term of this patent is extended or adjusted under 35 U.S.C. 154(b) by 370 days.

(21) Appl. No.: 16/682,973

(22) Filed: Nov. 13, 2019

(65) Prior Publication Data

US 2020/0151674 A1 May 14, 2020

Related U.S. Application Data

(60) Provisional application No. 62/760,729, filed on Nov. 13, 2018.

(51) Int. Cl.

| *G06F 3/0481* | (2022.01) |
|---|---|
| *G06Q 10/10* | (2012.01) |
| *G06F 9/54* | (2006.01) |
| *G08B 27/00* | (2006.01) |
| *G08B 5/22* | (2006.01) |
| *G08B 3/10* | (2006.01) |
| *G06F 15/02* | (2006.01) |

(52) U.S. Cl.
CPC ....... *G06Q 10/1095* (2013.01); *G06F 3/0481* (2013.01); *G06F 9/542* (2013.01); *G06F 15/0266* (2013.01); *G08B 3/1016* (2013.01); *G08B 5/223* (2013.01); *G08B 27/005* (2013.01)

(58) Field of Classification Search
CPC .......... G06Q 10/1095; G06Q 10/1093; G06Q 10/109; G06F 3/0481; G06F 15/0266; G08B 3/1016; G08B 5/223
See application file for complete search history.

(56) References Cited

U.S. PATENT DOCUMENTS

| 6,661,438 B1* | 12/2003 | Shiraishi | G06F 1/163 |
| | | | 715/810 |
| 2006/0066448 A1* | 3/2006 | Berisford | G16H 40/67 |
| | | | 340/504 |
| 2008/0294490 A1* | 11/2008 | Nuhaan | G06Q 10/063114 |
| | | | 705/7.19 |
| 2010/0077400 A1* | 3/2010 | Ioannou | G06Q 10/1095 |
| | | | 718/104 |
| 2013/0176127 A1* | 7/2013 | Junqua | G06F 16/211 |
| | | | 340/573.1 |
| 2019/0182371 A1* | 6/2019 | Ashall | G06F 3/0488 |
| 2020/0091951 A1* | 3/2020 | Zaloom | F16M 11/10 |

* cited by examiner

*Primary Examiner* — Andrew W Bee

(74) *Attorney, Agent, or Firm* — Schmeiser, Olsen & Watts, LLP

(57) ABSTRACT

Disclosed is an event notification and time awareness system having a caregiver computing device and a user notification device, each coupled to a computer server. The user notification device displays event information pertaining to the user, who may have cognitive impairment, including diminished comprehension of time, resulting in difficulty remembering appointments, or basic events related to routine daily living. The computer server is programmed to send event information to the user notification device, including appointments, daily routine activities, or other special messages, in response to data input to the caretaker computing device by a caretaker that may be located remotely from the user. The user notification device includes a grayed-out screen to partially obscure past events while leaving current and future events unobscured.

17 Claims, 4 Drawing Sheets

EVENT NOTIFICATION AND TIME AWARENESS SYSTEM

CROSS REFERENCE TO RELATED APPLICATION

This application claims priority to U.S. Provisional Patent Application to Mike Howell entitled "EVENT NOTIFICATION SYSTEM," Ser. No. 67/760,729, filed Nov. 13, 2018, the disclosures of which are hereby incorporated entirely herein by reference.

BACKGROUND OF THE INVENTION

Technical Field

This invention relates generally to event notification systems, and particularly to an event notification and time awareness system for persons with cognitive impairment that may be managed by a caretaker remotely.

State of the Art

Persons with cognitive impairment may have trouble remembering, learning new things, concentrating, or making decisions that affect their everyday lives. Millions of people throughout the world are living with cognitive impairment, and the number is increasing.

Many people with cognitive impairment want to maintain as much independence as possible in their daily living. Also, providing 24-hour care by a caretaker is often impractical or financially prohibitive. Many people with cognitive impairment have difficulty remembering appointments, or even basic events related to routine daily living, such as taking medications, eating, showering, brushing teeth, going to bed, and the like. Many such people are unable to use conventional time indication systems, such as clocks, calendars, timepieces, or mobile phones, and the like, because they are difficult to read or require cognitive abilities that are impaired in such people. Furthermore, many people with cognitive impairment have difficulty utilizing the concept of time as known by others with no cognitive impairment. For such people, traditional time as displayed on a clock may no longer be meaningful. For example, they may be able to state the current time and the time of an upcoming event but still have no real concept of the duration of time to pass between. They may be constantly anxious about meal times or upcoming activities. They may be awake in the middle of the night and unwilling to go back to sleep, unaware of how much nighttime still remains. They may call loved ones in the middle of the night because the time on the clock no longer signals that it is time for them and others to be asleep.

Accordingly, what is needed is an event notification and time awareness system to replace the conceptual framework of time displayed on a clock, that helps people with cognitive impairment to determine their current position within their daily schedule, that is simple to use by a user with cognitive impairment and that may be managed by a caretaker remotely.

SUMMARY OF THE INVENTION

The present invention relates to event notification systems, and particularly to an event notification and time awareness system for persons with cognitive impairment for helping them determine their current position within their daily schedule, that may be managed by a caretaker remotely.

The system may include a caretaker computing device coupled to a computer server and a user notification device also coupled to the computer server. The user notification device may be configured to hang on a wall, or rest on a support surface, such as a table, or a shelf or the like, or it may be configured to be worn by a user, such as by attachment to the user's body or clothing. The user notification device may be contained within a box having a display window for viewing a display screen of the device, wherein containment of the user notification device within the box prevents the user from powering off the device or changing settings of the device inadvertently. The box may be configured to hang on a wall, or rest on a support surface, such as a table, or a shelf or the like.

A caretaker computing device may run a caretaker application to send signals including event information to the computer server corresponding to caretaker input to the caretaker computing device. The computer server may be programmed to receive a signal including event information from the caretaker computing device, automatically process the event information, and send an event notification signal to the user notification device in accordance with the event information, wherein the event information is displayed on the display of the user notification device.

The system allows for a caretaker, such as a family member, a friend, a guardian, a nurse, or the like to enter event information into the caretaker computing device that is relevant to a user. The user may be a person with cognitive impairment that may have difficulty remembering appointments, or even basic events related to routine daily living, such as taking medications, eating, showering, brushing teeth, going to bed, and the like. Such persons may be unable to conceive of the passing of time or be cognitive of the current time relative to the entire day, for example. Event notifications are displayed on the user notification device to remind the user of such appointments and other events of daily living according to the information entered by the caretaker into the caretaker computing device.

Furthermore, it is an object of a preferred embodiment of the present invention to give a user having cognitive impairment perspective of his or her place in time relative to an entire day. For example, without limitation, a daily schedule may be displayed on a user notification device, wherein time increments, such as hourly increments, may be displayed in a column or a row, with corresponding events displayed by each time increment. Different colors may be used to highlight different types of events displayed on the user notification device. For example, without limitation, in a preferred embodiment, sleep time may be highlighted in gray, suggesting the darkness of night, while normal daily activities are highlighted in yellow, suggesting the brightness of day. Meal times may be highlighted in green and special events may be highlighted in red, although other colors or combinations thereof may be used. A translucent screen, such as a grayed-out box image (hereinafter referred to as a "TimeScreen"), having a leading edge corresponding to the current time of day that moves across the daily schedule, may gradually cover the schedule as events pass, leaving future events uncovered, while still allowing past events to be read through the translucent TimeScreen. The leading edge of the TimeScreen thereby distinguishes past events from future events, in a dramatically effective manner, to help persons with cognitive impairment or without time awareness to determine their position in time relative to the daily schedule.

In some embodiments, the status of the user notification device is communicated to the caretaker computing device by the computer server and displayed on the caretaker computing device in response to status signals sent to the computer server by the user notification device, wherein the status includes information regarding whether the user application is running and what information is being displayed on the display of the user notification device. The caretaker may thereby confirm that the user application device is being used correctly by the user.

In some embodiments, the event information may include a daily routine, wherein the daily routine is a plurality of daily activities, wherein display of each of the plurality of daily activities on the user notification device is repeated daily until terminated or modified by the computer server in response to a signal from the caretaker computing device. For example, a standard-day template, including routine sleep and wake times, meal times, and other regular daily activities, may be stored in the memory of the user notification device. The standard-day template may then be modified by the computer server, in response to signals received from the caretaker computing device.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to event notification systems, and particularly to an event notification and time awareness system for persons with cognitive impairment that may be managed by a caretaker remotely.

Figure 1:
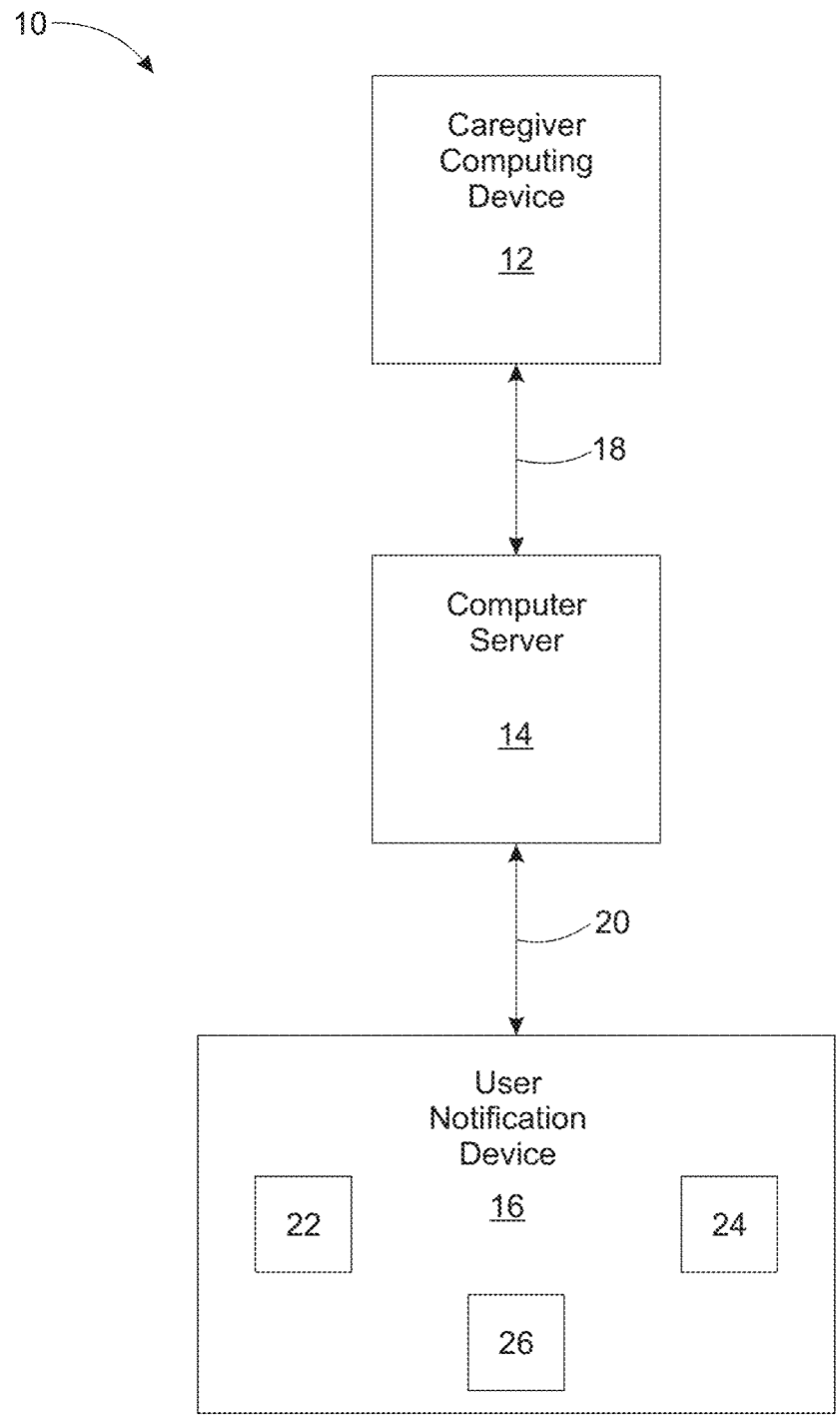
FIG. 1 is a diagrammatic view of an event notification and time awareness system according to an embodiment.

Referring to the drawings, FIG. 1 depicts an embodiment of an event notification and time awareness system 10. The system 10 may include a caretaker computing device 12 coupled to a computer server 14 by communication link 18 and user notification device 16 also coupled to the computer server 14 by communication link 20. Each of communication links 18 and 20 may be a network connection, such as an Internet connection, wherein the caretaker computing device 12 and the user notification device 16 may communicate with and receive communication from the computer server 14.

The caretaker computing device 12 may be any stationary or mobile computing device, such as, but not limited to a personal computer, laptop computer, smartphone, tablet, wearable technology and the like.

The user notification device 16 may comprise a memory 24, a processor 22, and a display 26. In some embodiments, the user notification device 16 may be configured to rest on a support surface, such as a table, or a shelf or the like. In some embodiments, the user notification device 16 may be configured to be worn by a user by attachment to the user's body or clothing. In some embodiments, the user notification device 16 may be powered by a battery or battery pack or the like and/or it may comprise a power cord coupled thereto for plugging into an external power source (not shown).

Figure 2:
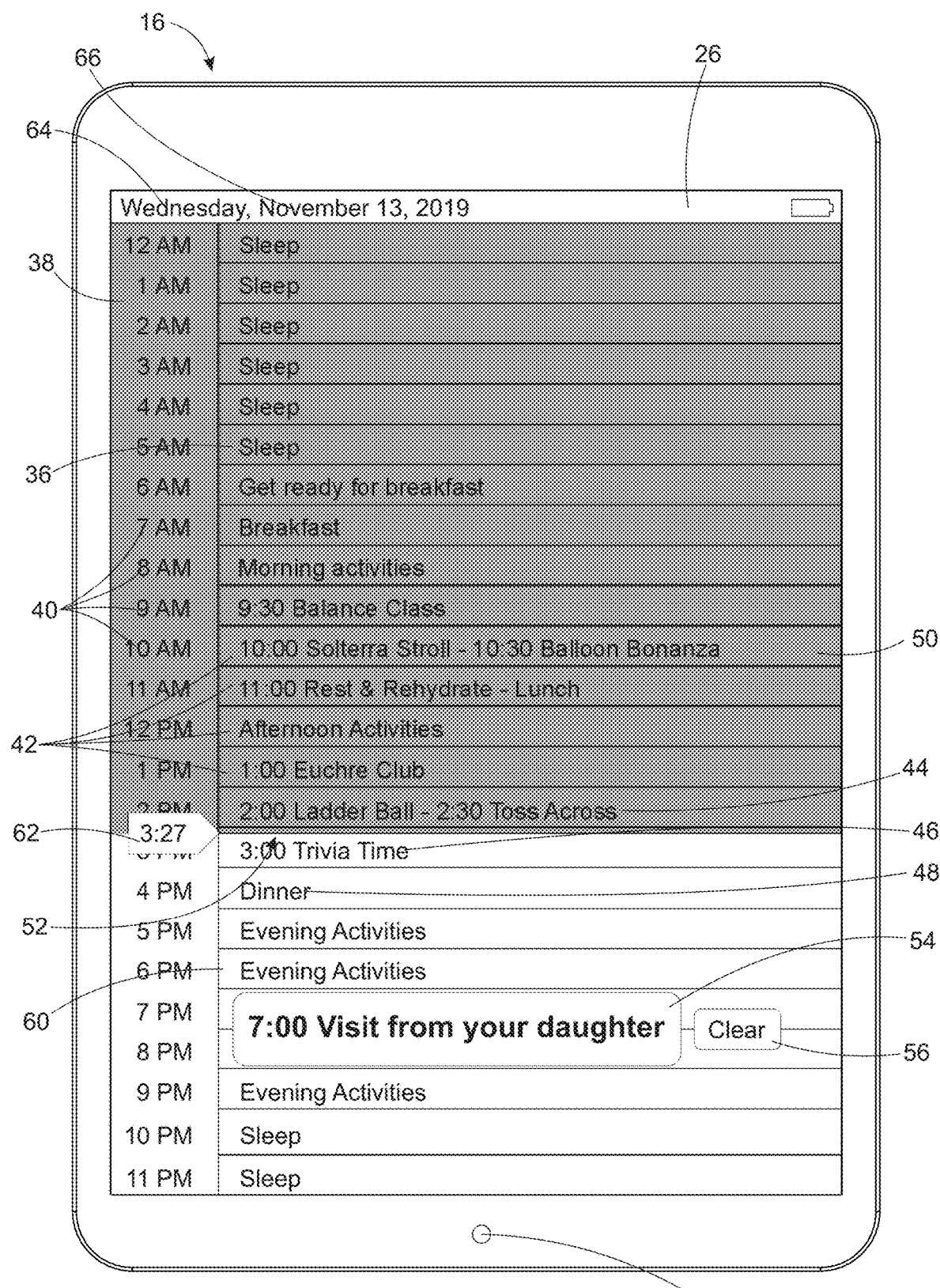
FIG. 2 is a front view of a user notification device of an event notification and time awareness system according to an embodiment.
Figure 3:
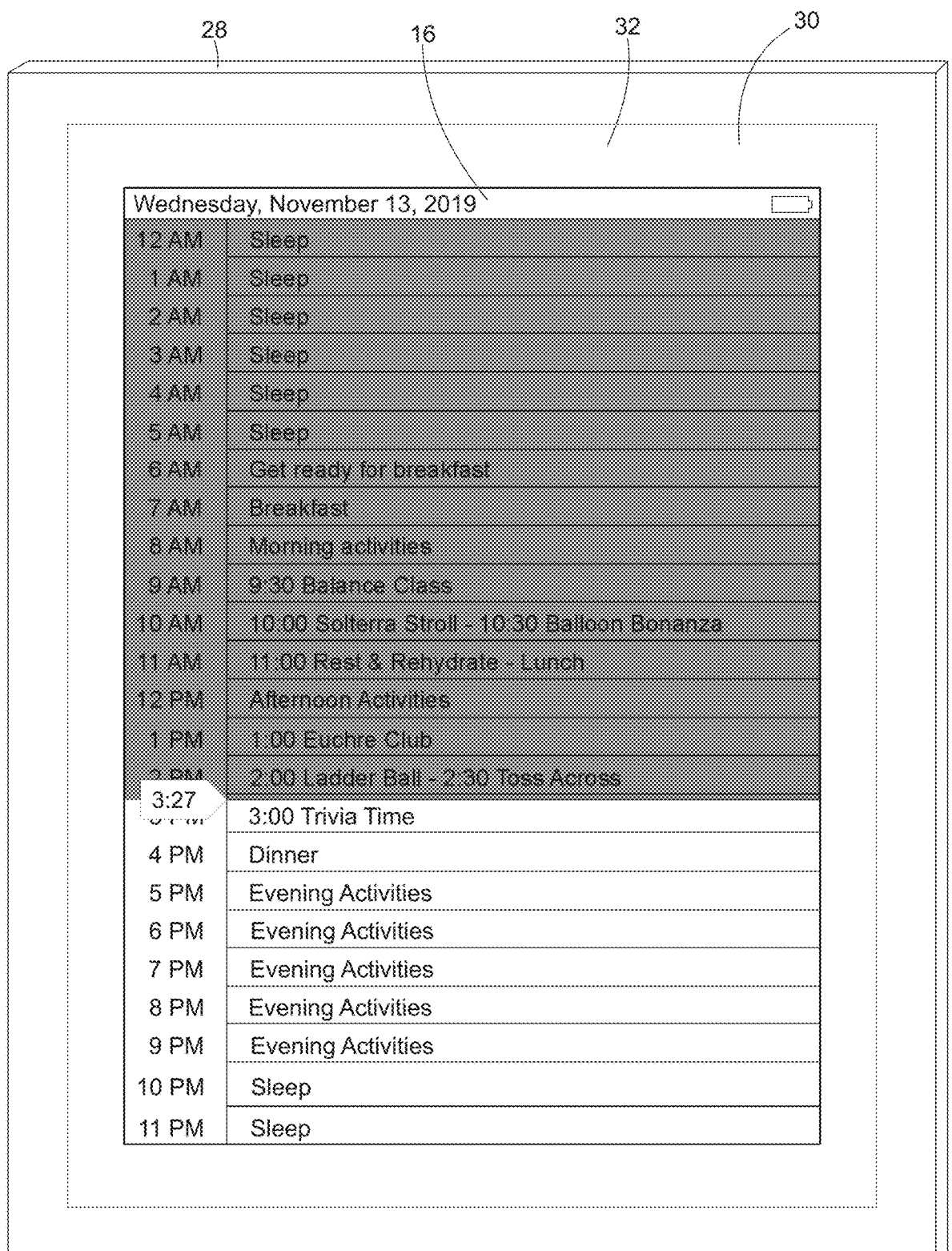
FIG. 3 is a front view of a user notification device contained within a display box of an event notification and time awareness system according to an embodiment.

The caretaker computing device 12 may run a caretaker application to send signals including event information to the computer server 14 corresponding to caretaker input to the caretaker computing device 12. The computer server 14 may be programmed to receive a signal including event information from the caretaker computing device 12; automatically process the event information; and send an event notification signal to the user notification device 16 in accordance with the event information, wherein the event information 36 is displayed on the display 26 of the user notification device 16, as shown in FIGS. 2 and 3.

The system 10 allows for a caretaker, such as a family member, a friend, a guardian, a nurse, or the like to enter event information into the caretaker computing device 12 that is relevant to a user. The user may be a person with cognitive impairment that may have diminished comprehension of time, resulting in difficulty remembering appointments, or even basic events related to routine daily living, such as taking medications, eating, showering, brushing teeth, going to bed, and the like. Event notifications 42 are displayed on the user notification device 16 to indicate to the user the imminence of such appointments and other events of daily living according to the information entered by the caretaker into the caretaker computing device 12. The caretaker computing device 12 may be in a remote location from the user notification device 16.

Figure 4:
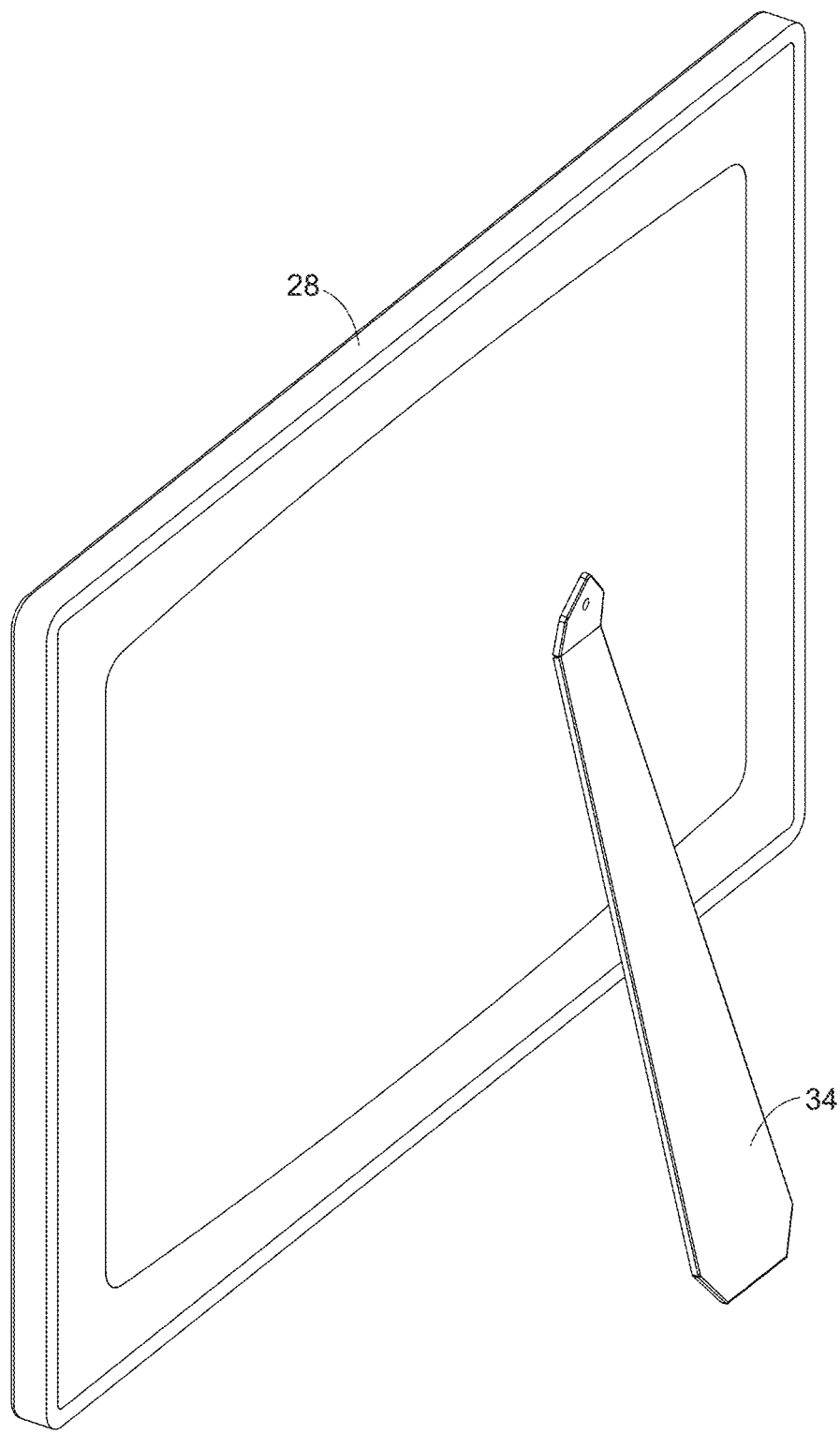
FIG. 4 is a rear perspective view of a user notification device contained within a display box of an event notification and time awareness system according to an embodiment.

To prevent the possibility of the user notification device 16 being inadvertently powered off by the user, in some embodiments of the system 10, the user notification device 16 is devoid of any means for the user to alter the settings of the device or to power off the device. As shown in FIGS. 3 and 4, the user notification device 16 may be contained within a display box 28 having a display window 32 for viewing a display 26 of the user notification device 16, wherein containment of the user notification device 16 within the display box 28 prevents the user from powering off the user notification device 16 or changing settings of the user notification device 16 inadvertently. The display box 28 may be configured to hang on a wall, or rest on a support surface, such as a table, or a shelf or the like. For example, as shown in FIG. 4, a kickstand 34 may be operationally coupled to the display box 28 for allowing the display box 28 to rest upright on a support surface.

In some embodiments, the status of the user notification device 16 may be communicated to the caretaker computing device 12 by the computer server 14 and displayed on the caretaker computing device 12 in response to status signals sent to the computer server 14 by the user notification device 16, wherein the status includes information regarding whether the user application is running and what information is being displayed on the display 26 of the user notification device 16. The caretaker may thereby confirm that the user notification device 16 is in operation and being used correctly by the user.

In some embodiments, the user notification device 16 is configured to be worn by the user, such as by attachment to the user's body or clothing. Referring to the drawings, FIGS. 2 and 3 illustrate examples of a display 26 of a user notification device 16 of an event notification and time awareness system 10. The user notification device 16 may be programmed to display the time of day 62 on the display 26. In some embodiments, the user notification device 16 may also be programmed to display current or expected weather information (not shown) in response to weather information obtained from the internet and display clothing recommendations corresponding to the weather information displayed. For example, if the temperature is below a predetermined temperature, the user notification device 16 may recommend the user wear a jacket.

The user notification device 16 may be configured to emphasize key events, such as by colorizing and/or highlighting upcoming events, or otherwise emphasizing by enlarging notifications of key events, in response to signals received from the computer server 14. Key events may include special appointments, key activities, the current activity, and the like.

It is an object of a preferred embodiment of the present invention to give a user having cognitive impairment perspective of his or her place in time relative to an entire day. For example, without limitation, a daily schedule 38 may be displayed on a user notification device 16, wherein time slots 40, such as time slots 40 corresponding to hourly increments, or other time increments, may be displayed in a column or a row, with corresponding events 42 displayed by each time increment. Different colors may be used to highlight different types of events 42 displayed on the user notification device 16. Different colors, fonts, or styles of text may also be used to distinguish different types of events 42. For example, without limitation, in a preferred embodiment, sleep time may be highlighted in gray, suggesting the darkness of night, while normal daily activities are highlighted in yellow, suggesting the brightness of day. Meal times may be highlighted in green and special events may be highlighted in red, although other colors or combinations thereof may be used.

A translucent screen 50, such as a grayed-out box image (referred to herein as a "TimeScreen"), having a leading edge 52 corresponding to the current time of day 62 that moves across the daily schedule 38, may gradually cover the daily schedule 38 as events 42 pass, leaving current and future events 46 and 48 uncovered, while still allowing past events 44 to be read through the translucent TimeScreen 50. The leading edge 52 of the TimeScreen 50 thereby distinguishes past events 44 from current and future events 46 and 48, in a dramatically effective manner, to help persons with cognitive impairment or without time awareness to determine their position in time relative to the daily schedule 38. The leading edge 52 of the TimeScreen 50 may further act to draw the user's attention to the current event 46, which is the event adjacent or just beyond the leading edge 52. Although, in preferred embodiments, as described, past events 44 are legible through a translucent TimeScreen 50, it is contemplated that a TimeScreen 50 may completely cover past events 44 so that they are no longer visible. Furthermore, the specific colors and/or shapes of the various features displayed on the display 26, including, without limitation, the TimeScreen 50, time slots 40, the daily schedule 38, events 42, sleep time, and the like, as described herein, are not intended to be limiting. Other colors and/or shapes may be utilized without departing from the teachings herein.

In some embodiments, as shown in FIGS. 2 and 3, any combination of the current time of day 62, day of the week 64, or date 66, including day, month, and/or year, may be displayed on the display 26 of the user notification device 16.

From time to time, the caretaker may enter information to the caretaker computing device 12 regarding a special message 54 or special alert 54, to be displayed on the user notification device 16, as shown in FIG. 2. Accordingly, in some embodiments, the user notification device 16 may comprise a single control 56 by which the user may close the special message 54 displayed on the display 26 in order to return the display 26 to a normal operating status in which the special message 54 is not displayed. Such a control 56 may be, without limitation, a soft key or virtual button, as shown in FIG. 2, or it may be a physical key or button, or the like (not shown). In some embodiments, the user notification device 16 may comprise a speaker 58, whereby the user notification device 16 sounds audible alarms to warn the user of upcoming events.

In some embodiments, as shown in FIG. 2, the event information may include a daily routine 60, wherein the daily routine 60 is a plurality of daily events 42, wherein display of each of the plurality of daily events 42 on the user notification device 16 is repeated daily until terminated or modified by the user notification device 16 in response to a signal from the caretaker computing device 12. For example, a standard-day template, including routine sleep and wake times, meal times, and other regular daily events 42, may be stored in the memory 24 of the user notification device 16. The standard-day template may then be modified or terminated by the user notification device 16, in response to signals received from the caretaker computing device 12.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. An event notification and time awareness system comprising:
   a computer server for running an application;
   a caretaker computing device running a caretaker application and communicatively coupled to the computer server;
   a user notification device communicatively coupled to the computer server, wherein the user notification device comprises:
   a processor;
   a memory coupled to the processor; and
   a display coupled to the processor; and
   a display box, comprising:
   an inner volume;
   a display window, wherein the user notification device is contained within the inner volume such that the display is viewable through the display window, and wherein the computer server is programmed to:
    receive a signal including event information from the caretaker computing device; and
    automatically process the event information and send an event notification signal to the user notification device in accordance with the event information, wherein the event information is displayed on the display of the user notification device; and wherein the display box prevents the user notification device from being powered off while the user notification device is contained within the inner volume thereof.

2. The event notification and time awareness system of claim 1, wherein the event information comprises:
a daily schedule, further comprising:
    an array of time slots; and
    a plurality of events, wherein each event of the plurality of events is selected from the group consisting of a past event, a current event, and a future event, wherein each event of the plurality of events corresponds to a time slot of the array of time slots.

3. The event notification and time awareness system of claim 2, wherein the user notification device is programmed to display a translucent TimeScreen, wherein a leading edge thereof, corresponding to a current time of day, progressively covers the daily schedule with the passage of time, wherein all past events are legible and partially obscured by the TimeScreen, and all current and future events are unobscured.

4. The event notification and time awareness system of claim 3, wherein a status of the user notification device is communicated to the caretaker computing device by the computer server and displayed on the caretaker computing device in response a status signal sent to the computer server by the user notification device, wherein the status includes information regarding whether the user application is running and what information is being displayed on the display of the user notification device.

5. The event notification and time awareness system of claim 3, wherein the user notification device is worn by the user.

6. The event notification and time awareness system of claim 3, further comprising a kickstand operationally coupled to the display box.

7. The event notification and time awareness system of claim 3, wherein the user notification device is communicatively connected to the internet, wherein the user notification device is programmed to display weather information in response to weather information obtained from the internet and display clothing recommendations corresponding to the weather information displayed.

8. The event notification and time awareness system of claim 3, wherein the user computing device sounds audible alarms to warn the user of upcoming events.

9. The event notification and time awareness system of claim 3, wherein the event information includes a daily routine, wherein the daily routine is a plurality of daily activities, wherein display of each of the plurality of daily activities on the user notification device is repeated daily until terminated or modified by the user notification device in response to a signal from the caretaker computing device.

10. An event notification and time awareness system comprising:
a computer server;
a caretaker computing device running a caretaker application and communicatively coupled to the computer server; and
a user notification device communicatively coupled to the computer server, wherein the user notification device comprises:
    a processor;
    a memory coupled to the processor; and
    a display coupled to the processor; wherein the computer server is programmed to:
        receive a signal including event information from the caretaker computing device; and
        automatically process the event information and send an event notification signal to the user notification device in accordance with the event information, wherein the event information is displayed on the display of the user notification device, wherein the event information comprises:
        a daily schedule, further comprising:
            an array of time slots; and
            a plurality of events, wherein each event of the plurality of events is selected from the group consisting of a past event, a current event, and a future event, wherein each event of the plurality of events corresponds to a time slot of the array of time slots, and wherein the user notification device is programmed to display a translucent TimeScreen, wherein a leading edge thereof, corresponding to a current time of day, progressively covers the daily schedule with the passage of time, wherein all past events are legible and partially obscured by the TimeScreen, and all current and future events are unobscured and
a display box, the display box comprising:
    an inner volume; and
    a display window, wherein the user notification device is contained within the inner volume such that the display is viewable through the display window, wherein the display box prevents the user notification device from being powered off while the user notification device is contained within the inner volume thereof.

11. The event notification and time awareness system of claim 10, wherein a status of the user notification device is communicated to the caretaker computing device by the computer server and displayed on the caretaker computing device in response a status signal sent to the computer server by the user notification device, wherein the status includes information regarding whether the user application is running and what information is being displayed on the display of the user notification device.

12. The event notification and time awareness system of claim 11, further comprising a kickstand operationally coupled to the display box.

13. The event notification and time awareness system of claim 10, wherein the user notification device is worn by the user.

14. The event notification and time awareness system of claim 10, wherein the user notification device is communicatively connected to the internet, wherein the user notification device is programmed to display weather information in response to weather information obtained from the internet and display clothing recommendations corresponding to the weather information displayed.

15. The event notification and time awareness system of claim 10, wherein the user notification device comprises a single control by which a user may close a special message displayed on the display of the user notification device.

16. The event notification and time awareness system of claim 10, wherein the user computing device sounds audible alarms to warn the user of upcoming events.

17. The event notification and time awareness system of claim 10, wherein the event information includes a daily routine, wherein the daily routine is a plurality of daily activities, wherein display of each of the plurality of daily activities on the user notification device is repeated daily until terminated or modified by the user notification device in response to a signal from the caretaker computing device.

* * * * *